(12) United States Patent
Toki

(10) Patent No.: US 8,983,697 B2
(45) Date of Patent: Mar. 17, 2015

(54) HYBRID VEHICLE CONTROL DEVICE

(75) Inventor: Yoshimasa Toki, Sagamihara (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 13/881,815

(22) PCT Filed: Oct. 12, 2011

(86) PCT No.: PCT/JP2011/073391
§ 371 (c)(1),
(2), (4) Date: May 29, 2013

(87) PCT Pub. No.: WO2012/056881
PCT Pub. Date: May 3, 2012

(65) Prior Publication Data
US 2013/0261865 A1 Oct. 3, 2013

(30) Foreign Application Priority Data

Oct. 28, 2010 (JP) .................................. 2010-241796

(51) Int. Cl.
*B60W 20/00* (2006.01)
*B60W 10/26* (2006.01)
(Continued)

(52) U.S. Cl.
CPC .................. *B60W 20/40* (2013.01); *B60K 6/48* (2013.01); *B60K 2006/4825* (2013.01); *B60W 10/02* (2013.01); *B60W 10/06* (2013.01); *B60W 10/08* (2013.01); *B60W 10/26* (2013.01); *B60W 20/00* (2013.01); *B60W 30/192* (2013.01); *B60W 50/029* (2013.01); *B60W 50/038* (2013.01); *B60W 50/045* (2013.01); *B60W 2510/244* (2013.01); *B60W 2710/081* (2013.01); *B60W 2710/244* (2013.01); *B60W 2710/248* (2013.01);
(Continued)

(58) Field of Classification Search
CPC ..... B60W 10/26; B60W 10/08; B60W 10/06; H01M 10/5004; F02D 29/02
See application file for complete search history.

(56) References Cited

U.S. PATENT DOCUMENTS

2002/0003417 A1* 1/2002 Bito et al. ..................... 320/152

FOREIGN PATENT DOCUMENTS

JP 2008-062745 A 3/2008
JP 2008-273518 A 11/2008
(Continued)

OTHER PUBLICATIONS

Mexican Office Action for the corresponding Mexican patent application No. Mx/a/2013/004809 issued on Jun. 9, 2014.

*Primary Examiner* — John R Olszewski
*Assistant Examiner* — Jason Roberson
(74) *Attorney, Agent, or Firm* — Global IP Counselors, LLP

(57) ABSTRACT

A control system is provided for controlling a hybrid vehicle that includes an internal combustion engine; an electric motor for starting the internal combustion engine; an inverter for controlling the electric motor; a clutch for selectively connecting and disconnecting power transmission between the internal combustion engine and the electric motor; and a battery for supplying power to the electric motor. The control device includes: a voltage detection unit for detecting the voltage of the battery a voltage control unit for controlling the output of the battery in accordance with a first power value currently available within the voltage limit range of the battery; and an internal combustion engine starting unit for engaging the clutch to start engine while controlling the inverter in accordance with the output from the battery that in turn is controlled by the voltage control unit.

16 Claims, 6 Drawing Sheets

(51) Int. Cl.

| | |
|---|---|
| *B60W 10/06* | (2006.01) |
| *B60K 6/48* | (2007.10) |
| *B60W 10/02* | (2006.01) |
| *B60W 10/08* | (2006.01) |
| *B60W 30/192* | (2012.01) |
| *B60W 50/029* | (2012.01) |
| *B60W 50/038* | (2012.01) |
| *B60W 50/04* | (2006.01) |
| *F02D 29/02* | (2006.01) |
| *F02N 11/04* | (2006.01) |
| *F02N 11/08* | (2006.01) |
| *B60L 11/14* | (2006.01) |
| *F02N 15/02* | (2006.01) |
| *B60L 7/14* | (2006.01) |
| *B60L 11/18* | (2006.01) |
| *B60L 15/20* | (2006.01) |

(52) U.S. Cl.
CPC ......... *B60Y 2400/3086* (2013.01); *F02D 29/02* (2013.01); *F02N 11/04* (2013.01); *F02N 11/0862* (2013.01); *F02N 2200/063* (2013.01); *Y02T 10/6221* (2013.01); *Y02T 10/6252* (2013.01); *Y02T 10/6286* (2013.01); *Y02T 10/7005* (2013.01); *Y02T 10/7077* (2013.01); *B60L 11/14* (2013.01); *B60W 2600/00* (2013.01); *Y10S 903/93* (2013.01); *F02N 15/025* (2013.01); *F02N 2011/0896* (2013.01); *F02N 2200/064* (2013.01); *F02N 2250/02* (2013.01); *B60L 7/14* (2013.01); *B60L 11/1859* (2013.01); *B60L 11/1861* (2013.01); *B60L 15/2009* (2013.01); *B60L 2210/40* (2013.01); *B60L 2220/14* (2013.01); *B60L 2240/421* (2013.01); *B60L 2240/423* (2013.01); *B60L 2240/427* (2013.01); *B60L 2240/441* (2013.01); *B60L 2240/443* (2013.01); *B60L 2240/545* (2013.01); *B60L 2240/547* (2013.01); *B60L 2240/549* (2013.01); *B60L 2250/10* (2013.01)
USPC ............................................ 701/22; 903/930

(56) References Cited

FOREIGN PATENT DOCUMENTS

| | | |
|---|---|---|
| JP | 2010-183785 A | 8/2010 |
| JP | 2010-218976 A | 9/2010 |
| JP | 5360306 B2 | 12/2013 |

* cited by examiner

HYBRID VEHICLE CONTROL DEVICE

CROSS-REFERENCE TO RELATED APPLICATIONS

This application is a U.S. National stage of International Application No. PCT/JP2011/072596, filed Sep. 30, 2011. This application claims priority to Japanese Patent Application No. 2010-241796, filed on Oct. 28, 2010. The entire disclosure of Japanese Patent Application No. 2010-241796 is hereby incorporated herein by reference.

BACKGROUND

1. Field of the Invention

The present invention relates to a control device for a hybrid vehicle.

2. Background Information

In an engine start control system for a hybrid vehicle provided with at least an engine, a motor to start the engine, an inverter to control the motor, and a battery to supply power to the motor via the inverter, such a technology is known to control the rotation speed of the motor in order the available output power to exceed a required power at the time of engine starting based on the available output power or the potential power output with the battery and the battery power needed to start the engine, the former being calculated based on data indicating a relationship among a battery temperature, battery residual capacity, a battery temperature detected by a battery temperature sensor and battery capacity detected by a battery controller. (Japanese Laid-Open Patent Application Publication No. 2008-62745).

SUMMARY

However, the potential output power calculated in the conventional technology refers to a power value that can be output on a stable basis for a predetermined period of time (equivalent to a "value of several seconds" used generally in the power control), and this power value (value of several seconds) is also used for comparison with the required power.

Since this power value (value of several seconds) indicates, as described above, the power value that can be output on a stable basis for the predetermined time, this presents a smaller value than the power value that can be output momentarily (instantaneous value). When comparing with the required power by using the power value (value of several seconds) like this, despite the fact that the power value (instantaneous value) exceeds the required power, since the power value (value of several seconds) falls below the required power, there is a risk of decreasing a target rotation speed of motor excessively. As the target rotation speed of motor decreases, the reliability of the engine start deteriorates with a risk of a longer period of time till the completion of engine start operation. Obviously, with the prolonged period of time to complete the engine start, the possibility that the predetermined time for stable power output assumed based on the power value (value of several seconds) will also be exceeded so that the reliability of the engine start will be further reduced.

The problem that the present invention is to solve is to improve the reliability of engine start for a vehicle in which the engine is started by an electric motor driven by power supply form the battery.

The present invention solves the above problem by starting the internal combustion engine by controlling the inverter while controlling the output of the battery by a voltage control unit in accordance with a first power value which can be output at the current time within the limit voltage or clamping voltage of the battery.

According to the present invention, the reliability of the engine start will be improved.

DETAILED DESCRIPTION OF THE EMBODIMENTS

Figure 1:
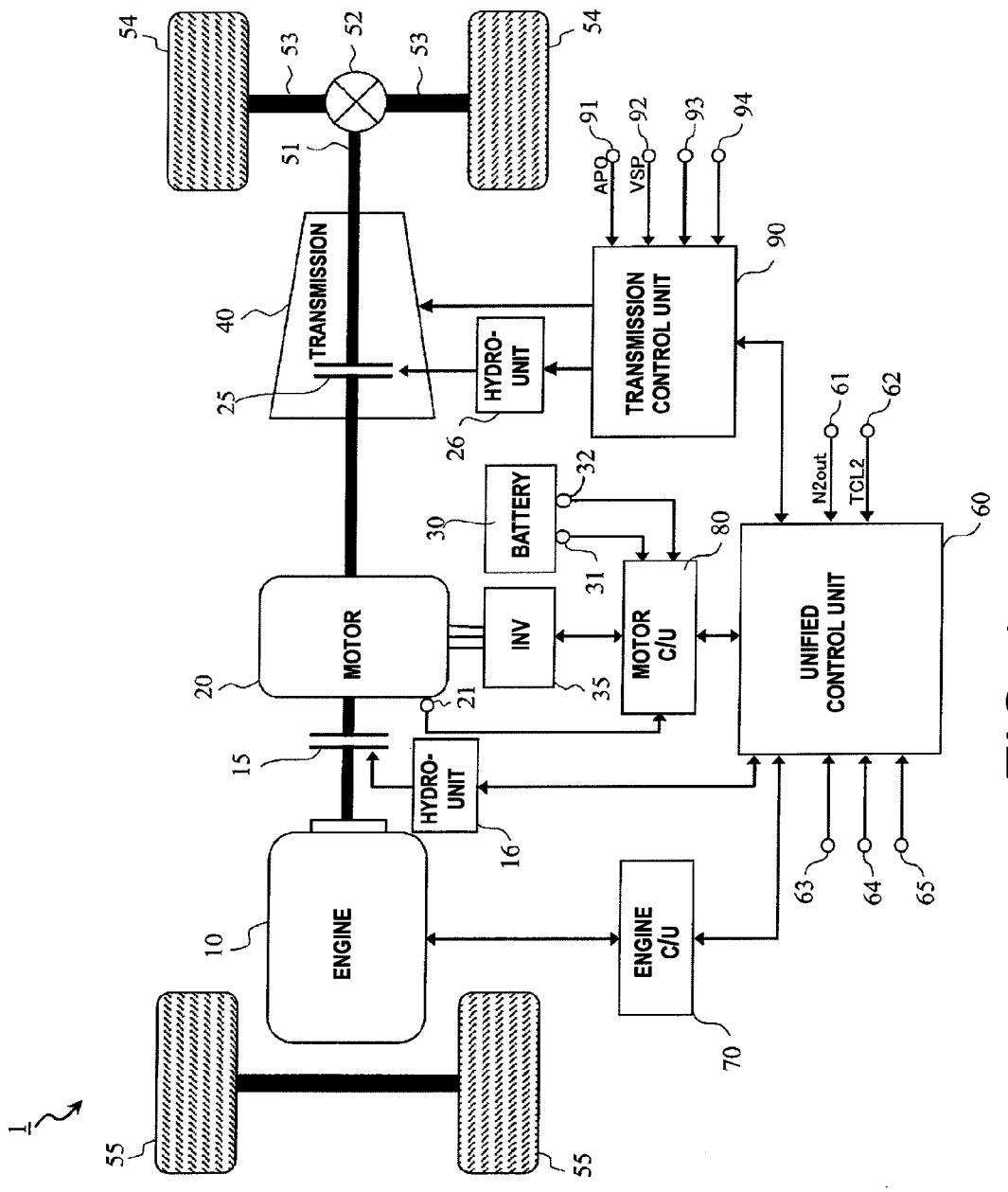
FIG. 1 is a block diagram showing an overall configuration of a hybrid vehicle in one embodiment according to the present invention.

The hybrid vehicle 1 incorporating the control system of the embodiment according to the present invention is a vehicle of parallel system using a plurality of power sources such as an internal combustion engine and an electrically driven generator. As shown in FIG. 1. the hybrid vehicle 1 in the present embodiment is provided with an internal combustion engine (hereinafter referred to as "engine"), a first clutch 15, an electrically driven generator 20 (hereinafter "motor/generator"), a second clutch 25, a battery 30, an inverter 35, an automatic transmission 40, a propeller shaft 51, a differential gear unit 52, a drive shaft 53, and a pair of (left and right) drive wheels 54.

The engine 10 is one of the driving source that outputs a drive energy by burning gasoline, light oil, etc., and a valve openness of throttle valve or fuel injection amount of fuel injection valve, etc. is controlled based on the control signal from the engine control unit 70.

The first clutch 15 is interposed between the output shaft of the engine 10 and the rotating shaft of the motor/generator 20, and is thus selectively connected and disconnected (ON/OFF operation) for power transmission between the engine 10 and the motor/generator 20. As an example of the first clutch 15, a multiple-plate wet clutch may be provided for continuously controlling the hydraulic flow rate and hydraulic pressure by way of a linear solenoid. At the first clutch 15, hydraulic pressure of the hydraulic unit 16 is controlled based on the control signal from a unified control unit 60, and the clutch plates of the first clutch 15 will thus be connected (including connection under slipped state) or released. It is also possible to employ a dry clutch for the first clutch 15.

The motor/generator 20 is a synchronous type motor/generator in which permanent magnets are embedded in a rotor and stator coils are wound around the stator. This motor/generator 20 is further provided with an rotation angle sensor 21 such as a resolver that detects a rotation angle of the rotor. The rotation speed of the motor/generator is controlled in accordance with the driving frequency of the inverter 35, where a ratio of the driving frequency of the inverter 35 presents a ratio of rotation speed (speed ratio) while the power supplied from the inverter 108 serves as driving force of the motor/generator 20. The motor/generator 20 functions not only as an electric motor but also as a generator.

On the other hand, when the rotor is rotated by external force, the motor/generator 20 generates AC power by causing an electromotive force at both ends of the stator coils (regeneration). The AC power generated by the motor/generator 20 is converted to DC power by the inverter 35, and then is charged to the battery 30. In addition, the motor/generator 20 may generate a negative torque during regeneration and thus performs a braking function with respect to drive wheel, as well.

The motor/generator 20 is also provided with the function of the starter motor. In order to start the engine 10, by supplying power to the motor/generator 20 from the battery 30, cranking of the engine 10 is performed by operating the motor/generator 20.

Example of battery 30 is listed by the assembled batteries connected in series or parallel, such as a plurality of lithium ion secondary battery or nickel-hydrogen secondary battery. A current-voltage sensor 31 and a temperature sensor 32 to estimate the internal resistance are attached to the battery 30, respectively and these detection outputs are output to the motor control unit 80.

Interposed between the motor/generator 20 and the left/right drive wheels 54 is a second clutch 25 for selectively connecting and disconnecting (ON/OFF operation) power transmission between motor/generator 20 and left and right drive wheels 54. The second clutch 25 may be formed as in the case of the first clutch 15, by a multiple-plate wet clutch, for example. At the second clutch 25, hydraulic pressure of hydraulic pressure unit 26 is controlled in accordance with control signal from a transmission control unit 90, the clutch plates of second clutch 25 will thus be connected (including a connection under slop state) or released.

The automatic transmission 40 is formed by a step transmission in which a plurality of speed ratios such as seven forward speed ratios and one reverse speed ratio are switched stepwise depending on the vehicle speed and accelerator opening degree or the like. The speed ratio of the automatic transmission 40 is controlled on the basis of a control signal from the transmission control unit 90.

Figure 2:
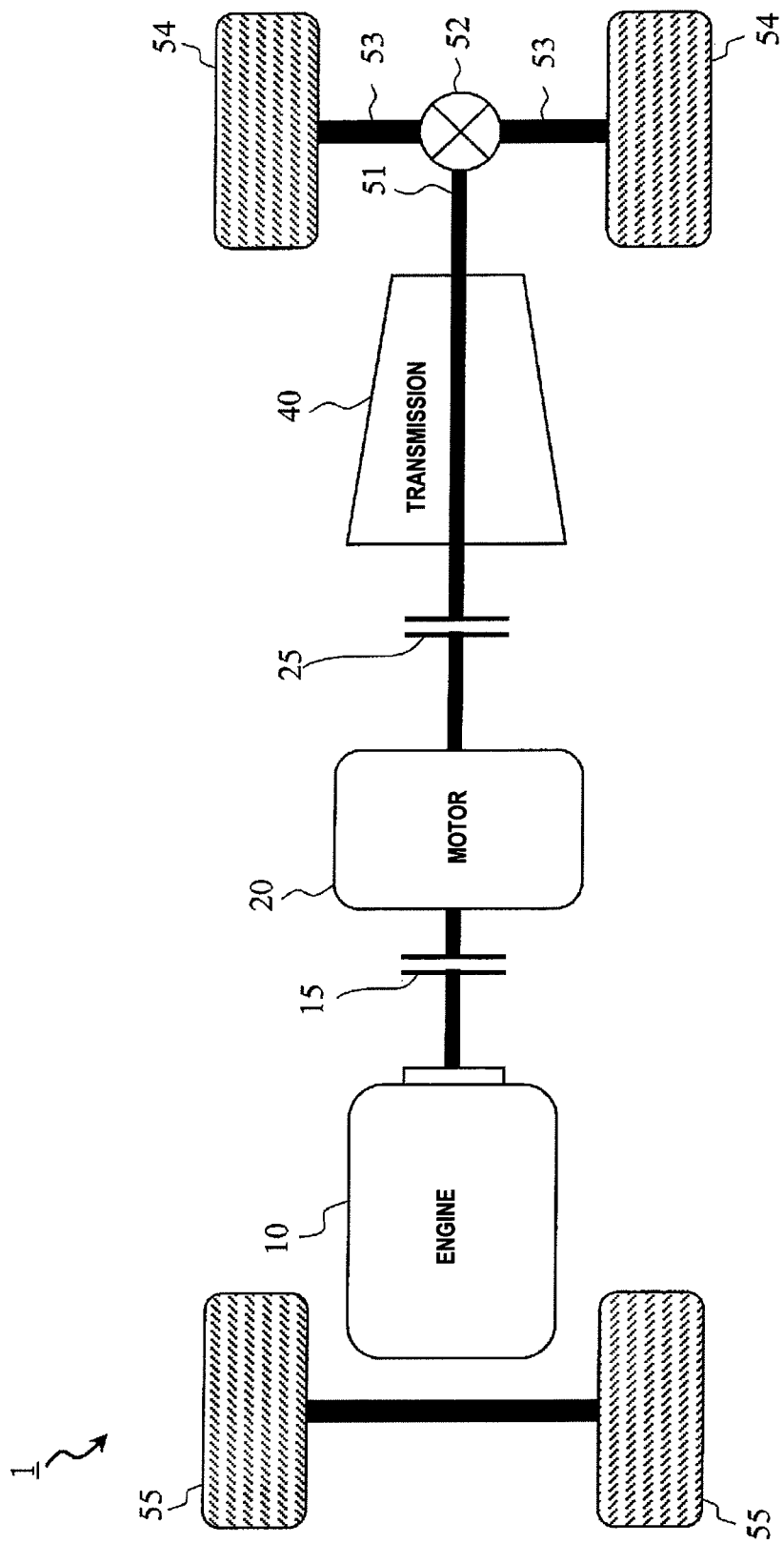
FIG. 2 is a diagram showing a power train of a hybrid vehicle of another embodiment according to the present invention.
Figure 3:
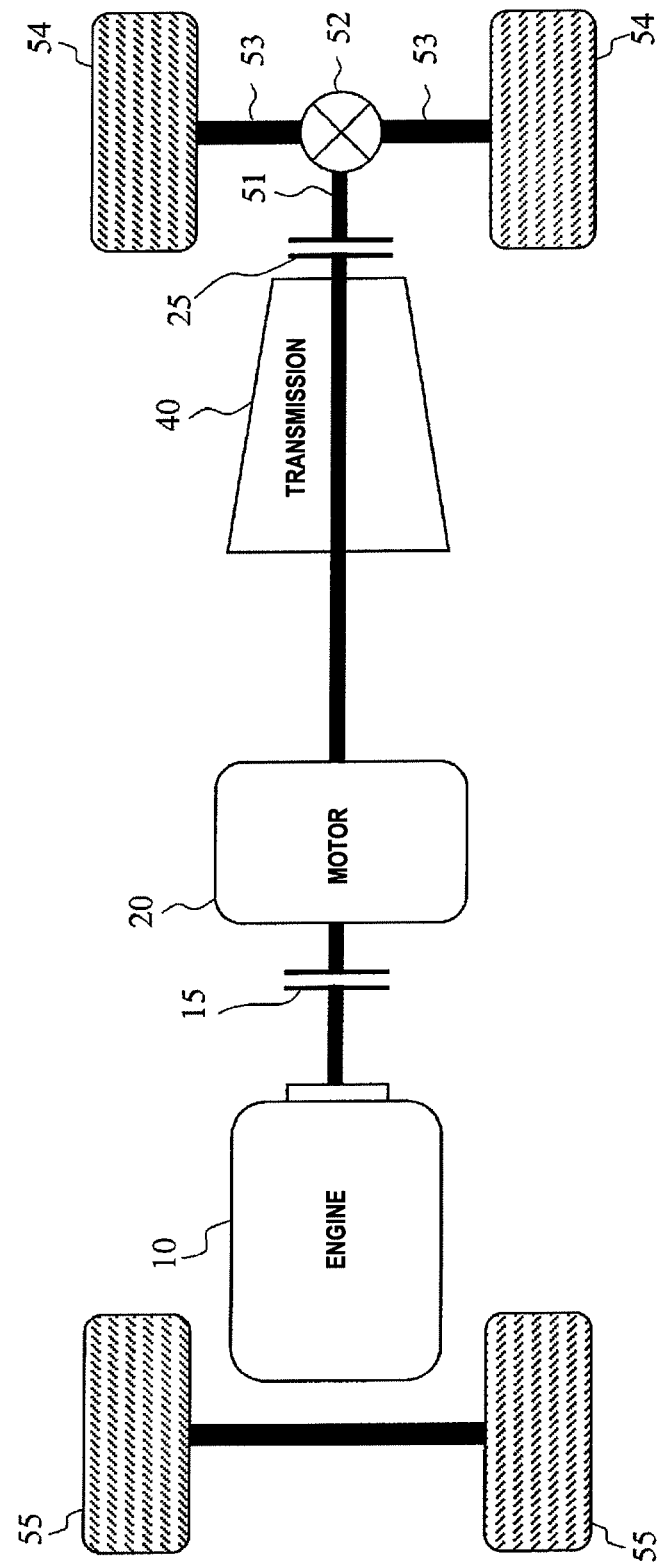
FIG. 3 is a diagram showing a power train of a hybrid vehicle of yet another embodiment according to the present invention.

The second clutch 25 may be commonly used, as shown in FIG. 1, with one or some elements among the plurality of frictional engagement elements which are fastened at each speed ratio of the automatic transmission 40. As alternative, the second clutch 25 may be separately provided from automatic transmission 40. For example, as shown in FIG. 2, the second clutch 25 may be a dedicated clutch interposed between output shaft of motor/generator 20 and input shaft of automatic transmission 40. Further, as shown in FIG. 3, the second clutch 25 may be a dedicated clutch interposed between the output shaft of automatic transmission 40 and input shaft of propeller shaft 51. Note that FIGS. 2 and 3 show configurations of hybrid vehicle in the other embodiments and the configurations other than the power train are the same as FIG. 1, only the parts related to power train is shown.

Note that, since a conventional step automatic transmission may be used the automatic transmission 40 of the present embodiment, its detailed structure is omitted. However, when configuring the second clutch 25 by making use of several friction engagement elements out of a plurality of friction engagement elements that are engaged or fastened in each speed ratio of automatic transmission, those friction engagement elements will be selected to be connected at the current speed ratio out of the friction engagement elements within automatic transmission 40.

Further, the automatic transmission 40 is not particularly limited to the stepped automatic transmission with seven forward and a reverse speed ratios as described above, and may be of a step transmission with five forward and one reverse speeds. Moreover, when the friction engagement element in the automatic transmission 40 is not commonly used as the second clutch 25, a continuously variable transmission is also applicable.

Returning to FIG. 1, the output shaft of the automatic transmission 40 is connected to the left and right drive wheels 54 via a propeller shaft 51, a differential gear unit 52 and left and right drive shaft 53. In addition, reference 55 in FIG. 1 denotes left and right steering wheel. Further, in FIGS. 1 to 3, although a rear-wheel drive hybrid vehicle is illustrated, it is also possible to apply to the hybrid vehicle with four-wheel drive or with the front wheel drive.

The hybrid vehicle in the present embodiment is able to be switched among various driving modes as described below by setting the engine 10 and/or the motor/generator 20 as drive source. Stated another way, respective travel or drive modes are switched below in accordance with depending upon the engaged/slipped/release states of the first and second clutches 15, 25.

In a travel or drive mode using the motor/generator (hereinafter referred to as EV drive mode), the first clutch 15 is released with the second clutch 25 engaged so that the vehicle travels with power from the motor/generator 20 only as power source.

In a travel or drive mode using the engine (hereinafter referred to as HEV drive mode), both the first and second clutches are engaged to propel the vehicle using power of at least the engine 10.

In addition to the above EV and HEV drive modes, another travel mode may be provided, i.e., a slip drive mode using the engine, in which vehicle is propelled by power including that from the engine 10 with the first clutch 15 engaged and second clutch maintained in a slipped state (hereinafter referred to as WSC drive mode, Wet Start Clutch). The WSC drive mode is operable to achieve a creeping travel of the vehicle particularly when the state of charge (SOC) of the battery 30 is low or when the temperature of cooling water of the engine 10 is low.

Note that, when switching to the HEV drive mode from the EV drive mode, the first clutch 15 that has been released is fastened to enable to start the engine using the torque of the motor/generator 20.

Further, during the HEV drive mode, an engine drive mode, motor-assisted drive mode and travel with generation are provided respectively. In the engine drive mode, drive wheels 54 are propelled using engine 10 only as a power source without operating the motor/generator 20. In the motor-assisted drive mode, both the engine 10 and the motor/generator 20 are driven to propel the drive wheels 54 by using the two as power source. Finally, in the travel with generation mode, the vehicle travels by driving the drive wheels 54 using the engine 10 as power source while charging the battery 30 by allowing motor/generator to function as generator.

Note that, in addition to the modes described above, in a vehicle stopped state, control may be further switched to a generation mode in which power of the engine 10 is used to allow the motor/generator to function as generator to charge the battery 30 or to supply power to electrical equipment.

As shown in FIG. 1, the control system of the hybrid vehicle 1 in the present embodiment is provided with the unified control unit 60, the engine control unit 70, the motor control unit 80, and a transmission control unit 90. These control units 60, 70, 80, 90 are connected to each other via a CAN communication, for example.

The engine control unit 70 controls the opening degree of the electronic control throttle to obtain the target engine torque calculated by the unified or integrated control unit 60. An intake air amount in accordance with throttle opening is introduced into the engine 10 and the intake air amount is measured by an airflow meter (not shown) disposed at the upstream of the electronic control throttle. The engine control unit 70 controls the fuel injection using a fuel injector based on the intake air amount and rotation speed of engine detected by a crank angle sensor (not shown) and further controls ignition timing using a spark plug. Note that information about the engine rotation speed Ne, the engine torque Te is output to the unified control unit 60 via CAN communication line.

The motor control unit 80 receives information from the rotation angle sensor 21 disposed at the motor/generator 20 and outputs to the inverter 35 a command to control an operating point of the motor/generator 20 (the motor rotation speed Nm, the motor torque Tm) to control drive frequency of the inverter 35 so that a target rotation speed and a target torque calculated by the unified control unit 60 may be acquired. In addition, the motor control unit 80 calculates and manages a state of charge (SOC) of the battery 30 based on the current and voltage values detected by the current/voltage sensor 31. This battery SOC information is used as control information of the motor/generator 20 and sent to the unified control unit 60 via the CAN communication line. Moreover, the motor control unit 80 estimates the motor/generator torque Tm based on value of current flowing in the motor/generator 20 (based on the sign of the current value a distinction is made between a motor drive control torque and regenerative control torque). The information about this motor/generator torque Tm will be transmitted to the unified control unit 60 via the CAN communication line. In addition, the motor control unit 80 transmits a battery temperature detected by the temperature sensor 32 to the unified control unit 60.

Transmission control unit 90 receives sensor information from an accelerator opening sensor 91, a vehicle speed sensor 92, a second clutch hydraulic pressure sensor 93, the inhibitor switch 94 that outputs a signal corresponding to the position of the shift lever operated by the driver, and outputs to the hydraulic unit 26 an instruction to control the engagement and release of the second clutch 25 based on a second clutch control instruction from the unified control unit 60. Note that the information regarding the accelerator opening APO, vehicle speed VSP, and inhibitor switch is transmitted to the control unit 60 via CAN communication line.

By managing the energy consumption of the overall hybrid vehicle 1, the unified control unit 60 is responsible for the function to propel the hybrid vehicle 1 efficiently. The unified control unit 60 obtains sensor information from the second clutch output rotation speed sensor 61 that detects output rotation speed N2 out of the second clutch 25. The unified control unit 60 obtains sensor information from the second clutch torque sensor 62 that detects the transmission torque capacity TcL2 of second clutch 25. The unified control unit 60 obtains sensor information from the brake hydraulic pressure sensor 63. The unified control unit 60 obtains sensor information from the temperature sensor 64 that detects a temperature of the second clutch 25. The unified control unit 60 obtains sensor information from the G sensor 65 that detects longitudinal and lateral acceleration of the vehicle. In addition to this information, the unified control unit 60 further receives sensor signals via CAN communication line.

Moreover, the unified control unit 60 carries out, based on this information, an operation control of the engine 10 by the control instruction to the engine control unit 70, an operation control of the motor/generator 20 by control instruction to the motor control unit 80, an operation control of the automatic transmission 40 by control signal to the transmission control unit 90, an engagement/release control of the first clutch 15 by a control instruction to the hydraulic unit 16 of the first clutch 15, and an engagement/release control of the second clutch 25 by a control signal to the hydraulic unit 26.

Also, the unified control unit 60 receives signals responsive to ignition key being turned ON by the driver or an idling stop release condition being satisfied. In addition, in a vehicle stopped state or at the vehicle drive at low load, provided that a predetermined engine automatic stop conditions are satisfied (i.e., vehicle speed is below a predetermined vehicle speed, acceleration depression amount is below a predetermined amount, etc.), the engine 10 will be stopped automatically to further reduce the fuel consumption and exhaust emissions.

Figure 4:
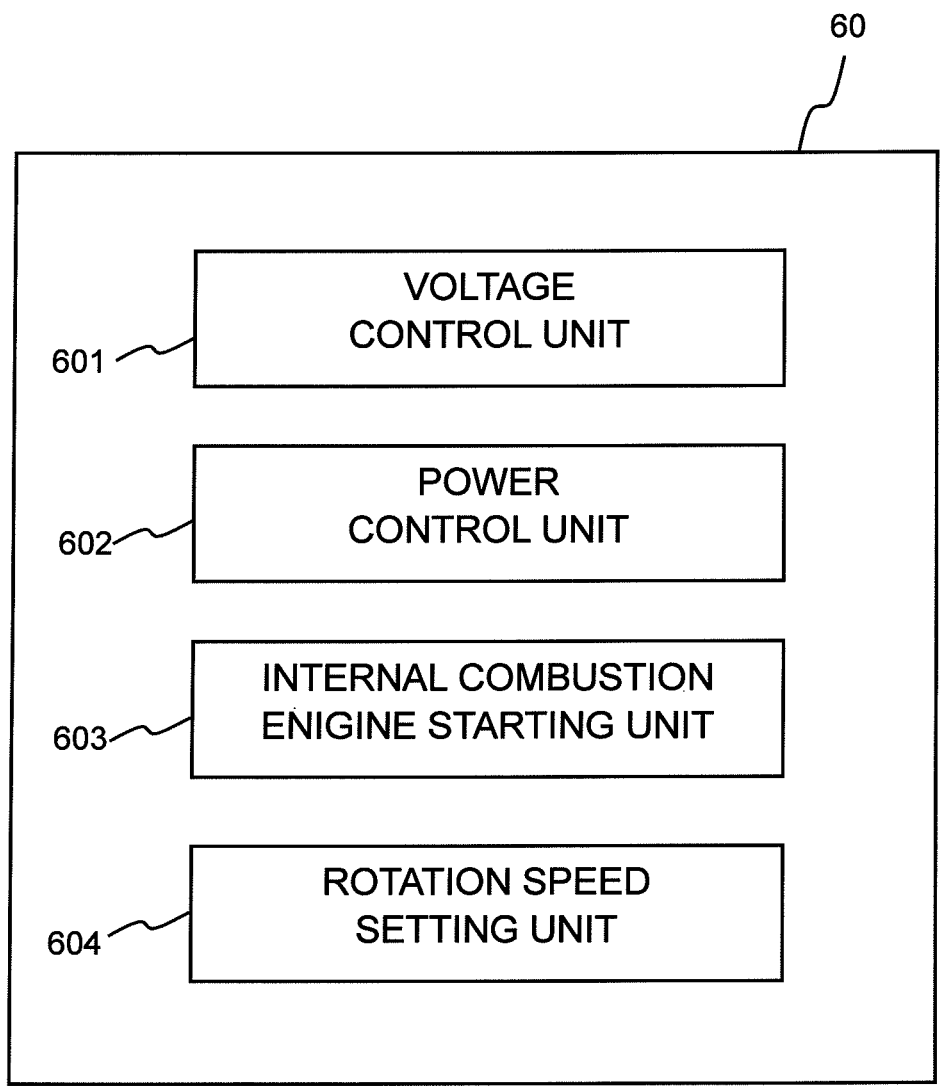
FIG. 4 is a control block diagram showing the details of the unified control unit in FIG. 1.

Now, description is made of the control executed by the unified control unit 60. FIG. 4 is a control block diagram showing the details of the unified control unit 60. As shown, in FIG. 4, the unified control unit 60 includes a voltage control unit 601, a power control unit 602, an engine starting unit 603 and a rotation speed setting unit 604.

The voltage control unit 601 controls power output from the battery 30 depending on detected voltage of the battery 30 detected by the voltage sensor 31, the battery temperature and the degradation state of battery. With respect to the voltage control unit 601, the upper voltage limit and the lower voltage limit are respectively set, and the voltage of battery 30 will be controlled within a safe voltage range between the lower voltage limit and the upper voltage limit. The upper voltage limit or the lower voltage limit indicates a restrictive voltage at which battery 30 can be used safely.

As described above, the motor control unit 80 sets the driving frequency of the inverter 35 in response to a request to the motor/generator 20 regarding a target torque instructed from the unified control unit 60. In order to operate the inverter 35 in that driving frequency, discharge current of the battery 30 flows from the battery 30 to the inverter 35.

If the detected voltage of the battery 30 is higher than the lower voltage limit, a current corresponding to the drive frequency set is discharged from the battery 30. That is, without restricting the power of the battery 30 within the voltage limits, the voltage control unit 601 allows to supply power from the battery 30 to the inverter 35. On the other hand, when the detection voltage of the battery 30 is lowered and reaches the lower voltage limit, the voltage control unit 601 does not discharge the current corresponding to the drive frequency from the battery 30, but restrict the discharge current from the battery 30 to thereby control the detection voltage of the battery 30 not to fall below the lower voltage limit. Moreover, when the detection voltage of the battery 30 further decreases and falls below the lower voltage limit, the voltage control unit 601 further restricts the current discharged from the battery 30. In other words, the voltage control unit 301 does not pose restriction on the outputtable or available output power of the battery 30 when the detection voltage of the battery 30 is higher than the lower limit value and outputs the power corresponding to the drive frequency of inverter from battery 30. On the other hand, when the detection voltage of the battery 30 is equal to or below the lower voltage limit, then the power of the battery 30 will be restricted and the power that is lower than the available power with the battery 30 will be outputted. Thus, the voltage control unit 601 controls the output of the battery 30 by comparing the detection voltage of the battery 30 with the lower voltage limit as a restrictive voltage and in accordance with the comparison results.

When charging the battery 30 by regenerative operation of the motor/generator 20, the voltage control unit 601 controls the input voltage of the battery 30 in accordance with the comparison result between the detection voltage of the battery 30 and the upper voltage limit. In other words, when the detection voltage of the battery 30 is lower than the upper voltage limit, the voltage control unit 601 does not pose any restriction on power derived from regenerative operation of the motor/generator and supply to the battery 30. When the detection voltage of the battery 30 reaches the upper voltage limit, the voltage control unit 601 controls to lower the charging voltage to the battery 30 to thereby pose restriction on the power due to the regeneration of the motor/generator 20 while controlling the input power of battery 30.

Based on the state of the battery 30, the power control unit 602 refers to a map stored in advance and calculates an output of the battery 30, and subsequently controls the output of the battery 30 so that the output corresponding to the drive frequency of the inverter 35 may be output from the battery 30 to the inverter 35. The power control unit 602 uses the state of charge (SOC) of the battery 30, the temperature of the battery 30, and the degree of deterioration of the battery 30, etc., as representative of the state of the battery 30. The SOC of the battery 30 may be calculated by current and voltage detected by the current sensor and the voltage sensor 31, respectively, while temperature of the battery 30 is detectable by the temperature sensor 32. The map stored in the power control unit 602 relates output power of the battery 30 with respect to SOC, temperature of battery 30 and deterioration. In addition, the power control unit 602 refers to the map stored therein for calculation of output power of the battery 30 based on the calculated SOC and detected temperature.

Here, the output power calculated with reference to the map by the power control unit 602 indicates a power that is outputtable or available from the battery 30 (two seconds value, for example) for a predetermined time (two seconds for example). Therefore, when power is required from the battery 30 which exceeds the power calculated by the power control unit 602, control is carried out by the power control unit 602 not to output the power exceeding the calculated power from the battery 30. In addition, the power control unit 602 uses a map for calculating the power that is outputtable for a predetermined time. Thus, when the calculated power is required for a time longer than the predetermined time, it may occur that the calculated power will not be output from the battery 30.

The internal combustion engine starting unit 603 drives the engine 10 based on the start signal to start the engine 10, by driving the motor/generator 20 via the motor control unit 80. When ignition switch (not shown) has been turned ON, the starting signal to start up the engine 10 is transmitted from the switch for receipt by the motor control unit 80. In addition, the internal combustion engine starting unit 603 also starts up the engine 10 when transitioning from EV drive mode to HEV drive mode, and when transitioning from EV drive mode to a mode in which the vehicle is propelled by engine only. Note that switching in drive mode is managed by the unified control unit 60 depending on the accelerator opening and vehicle speed.

The rotation speed setting unit 604 sets the rotation speed of the motor/generator 20 when cranking to start the engine 10. In addition, the rotation speed setting unit 604 lowers rotation speed of the motor/generator 20 and thereby lowers the power necessary to start up the engine 10 when the power value (instantaneous value) calculated by the voltage control unit 601 is lower than the power necessary to start the engine 10.

Now, description is made of control at starting the engine 10 by referring to FIGS. 1 and 4. First, the unified control unit 60, in response to receipt of a starting signal to start the engine 10 from the state in which the SOC of the battery 30 is low and in a vehicle stopped state, controls the power of the battery 30 by the voltage control unit 60. In addition, the unified control unit 60 detects a temperature of the battery 30 by the temperature sensor 32. With the unified control unit 60, a threshold temperature is set for switching the lower voltage limit. Further, when the temperature of the battery 30 is higher than the lower limit temperature, the voltage control unit 601 controls the battery 30 without lowering the previously set lower voltage limit while at the temperature of the battery 30 being lower than the threshold temperature for switching the lower voltage limit, then the voltage control unit 60 controls the battery 30 by decreasing the lower voltage limit previously set.

It should be noted here that, when the temperature of the battery 30 is lower than the threshold temperature for switching the lower voltage limit, as a characteristic of the battery 30, the IV characteristics (current-voltage characteristics) indicates the characteristic with downward convex shape. Therefore, when the output voltage of battery is lowered, the discharge current of the battery 30 will be even higher so that the power of the battery 30 which corresponds to the product of voltage and current will be higher than the power prior to the lowering the voltage. On the other hand, when temperature of the battery 30 is higher than the threshold temperature (such as in the state of room temperature), the lowering the output voltage of the battery 30 will lead to the higher power of the battery 30, yet the amount of power increase is small compared with the state in which temperature of the battery 30 is low. In addition, even if the voltage range assures the safety of the battery 30, when the battery 30 would be discharged at low temperature, the deterioration of the battery 30 will be accelerated. Thus, the threshold temperature is selected to be the temperature at which increase in power will be expected by lowering the voltage in view of the characteristics of the battery 30 involved. Therefore, when the temperature of the battery 30 is higher than the threshold temperature, the voltage control unit 601 does not reduce the lower voltage limit. In this way, shortening of the life of the battery 30 is prevented. When the temperature of the battery 30 is lower than the threshold temperature, the voltage control unit 601 may enhance power of the battery 30 by lowering the lower voltage limit.

Further, the voltage control unit 601 calculates an instantaneously outputtable or available power value (instantaneous value) with battery 30 based on the detection voltage of the voltage sensor 31 and the current that can be discharged from the battery 30, and compares the power value (instantaneous value) calculated by the calculation and the power necessary to start the engine 10. When the calculated power value (instantaneous value) is higher than the power necessary to start the engine 10, the voltage control unit 601 supplies the power of the battery 30 to the motor/generator 20, and the internal combustion engine starting unit 603 engages the clutch 15 to thereby start the engine 10. On the other hand, when the calculated power is lower than the power necessary to start the engine 10, the rotation setting unit 604 lowers rotation speed of motor so as to allow the power value (instantaneous value) to be higher than the power necessary to start the engine 10, then the internal combustion engine starting unit 601 engages the clutch 15 to start the engine 10.

The motor control unit 80 sets the drive frequency to start the engine 10 and controls the inverter 35. Further, when the detection voltage of the battery 30 is higher than the lower voltage limit, the voltage control unit 60 does not pose restriction on power of the battery 30, thus the power will be output in accordance with the set drive frequency.

If the engine 10 has been combusted or exploded completely before the voltage of the battery 30 reaches the lower voltage limit, since regeneration by the motor/generator 20 using the power of the engine 10 may now be used to charge the battery 30, the voltage of the battery 30 may be maintained higher than the lower voltage limit. On the other hand, in response to the engine 10 being cranked and voltage of battery being thereby lowered to reach the lower voltage limit, then the voltage control unit 601 restricts on output power from the battery 30 and controls in such a way that the voltage of the battery 30 will not fall below the lower voltage value. At this instance, since the engine 10 is already cranking, the engine 10 may be continuously cranked even at the power necessary to start the engine 10.

Incidentally, in the case of starting the engine 10 by the power control using the map, the power control unit 602 calculates the outputtable or potential power (value of several seconds) that is available for a predetermined time, as described above. Therefore, despite the situation in which the power value (instantaneous value) that is available momentarily or instantaneously is higher than the required power, because the power value (value of several seconds) is below the required power, there has been a possibility that the target motor rotation speed of motor is forced to be lowered more than necessary. As the target motor rotation speed decreases, the time duration required up to the timing at which the engine 10 is combusted completely from cranking. Thus, the reliability of engine start will be reduced and the time to complete engine start is prolonged. Needless to say, when the time up until engine start completion is prolonged, the power value (value of several seconds) calculated by the power control unit 602 may not be output to the engine 10 on a continuous basis until engine start-up completion. In addition, in a situation in which the rotation speed for starting the engine 10 is set lower by the rotation speed setting unit 604, the certainty that the number of fuel injection will be larger up until complete combustion or self sustaining or autonomous rotation with reduced reliability of engine start-up, it is even difficult to accurately grasp the required time up to the complete combustion. Therefore, the accuracy with which to estimate the power required to start the engine 10 is deteriorated.

Further, by the sensors for vehicle control used in power control by the power control unit 602 or a CPU such as used in the unified control unit 60, the state of the battery 30 may not necessarily be estimated with accuracy, so that the calculated power can differ from the actually available power with battery 30, or the actually available output period of battery is possibly be longer than the predetermined period of the power value calculated. Therefore, the accuracy of the calculated power is deteriorated with respect to the actual output power of the battery 30.

More specifically, when starting the engine 10 through power control, the rotation speed of motor has been set to an excessively lower speed, or engine cannot be started actually despite the calculation predicting a successful start-up.

As described above, since the engine 10 is started by output of the battery 30 that is controlled by the voltage control unit 601, the engine 10 may be started by supplying the actually available power with the battery 30 to the motor/generator 20 until the voltage of the battery 30 reaches the lower voltage limit. In the present embodiment, in response to the driver's operation of ignition switch turning ON to start the engine 10, for example, the power control of the battery 30 by the power control unit 602 is prohibited while the output of battery 30 is controlled by the voltage control unit 601 only to thereby start the engine 10.

Further, through the voltage control, based on the comparison between the power value (instantaneous value) and the required power value and, by executing the rotation speed setting by the rotation speed setting unit 604, the rotation speed of the motor/generator 20 for starting the engine 10 will be suppressed from being set excessively lower than necessary. Thus by carrying out the rotation speed setting by the power value (instantaneous value) while controlling the output within the upper and lower voltage limit range, the reliability of engine start up may be significantly improved.

Figure 5A:
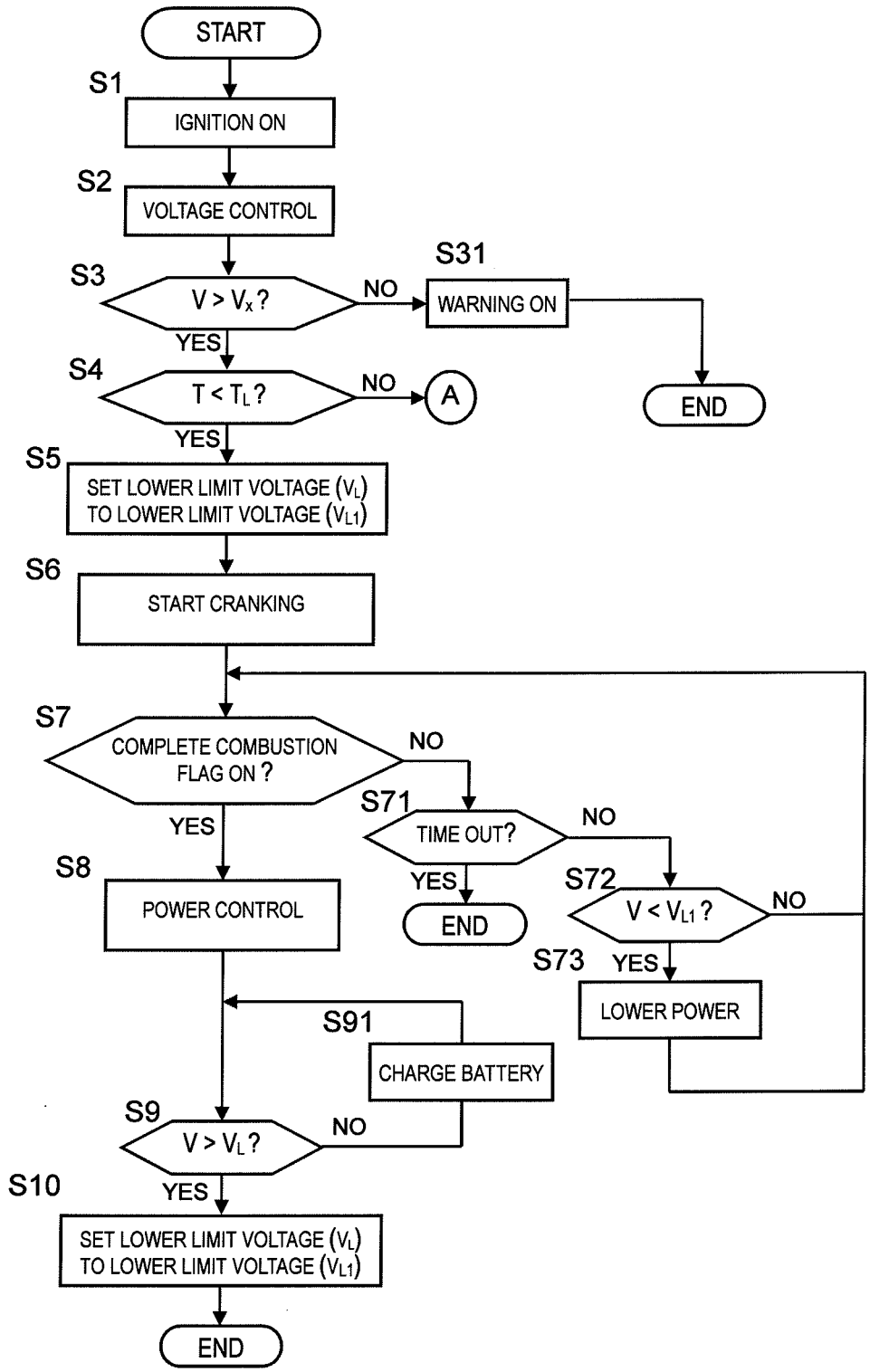
FIG. 5a is a flow chart showing a control procedure in the unified control unit in FIG. 1.
Figure 5B:
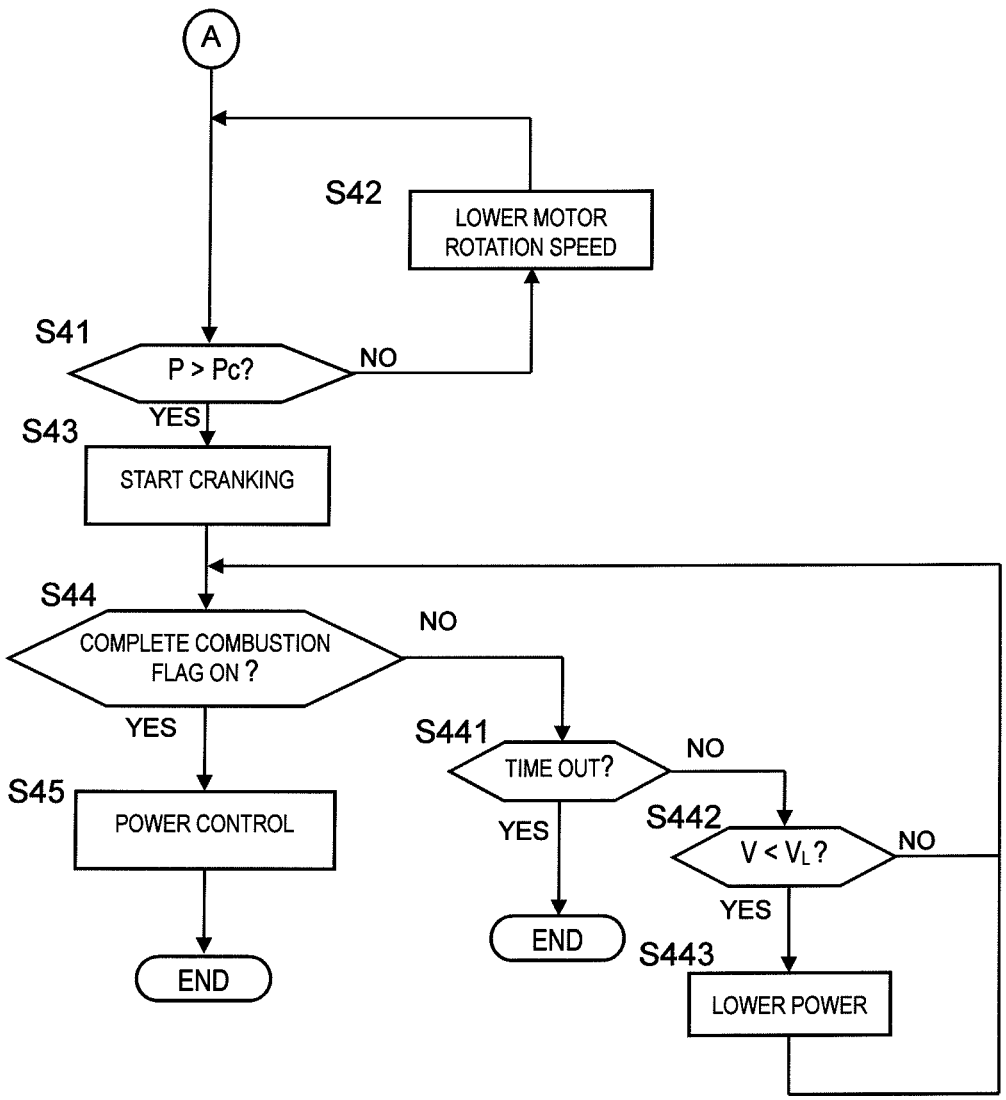
FIG. 5b is a flow chart showing a control procedure in the unified control unit in FIG. 1.

Now, using FIGS. 5*a* and 5*b*, the control procedures of the control system in the hybrid vehicle in the present embodiment is described. FIGS. 5*a* and 5*b* show flow charts respectively showing a control procedure in the control system of the hybrid vehicle.

Upon the operation of the present control system being started, in step S1, the driver turns on the ignition switch, and the unified control unit 60 receives a starting signal to start the engine 10. In step S2, the unified control unit 60 controls output of battery 30 by voltage control unit 601. In step S3, the voltage control unit 601 detects an open circuit voltage across the battery 30 by using the voltage sensor 31 to compare with a predetermined threshold voltage (Vx). The predetermined threshold voltage (Vx) is set in advance for protection of the battery 30. When the open circuit voltage of the battery 30 is higher than the threshold voltage (Vx), control proceeds to step S4. On the other hand, when the open circuit voltage of the battery 10 is lower than the threshold voltage (Vx), the voltage control unit 601 withholds to start the engine 10 at step S31 but lights a warning bulb not shown and thereby alerts to the occupant.

In step S4, the unified control unit 60 compares a detected temperature (T) of the battery 30, which is detected by the temperature sensor 32 and a threshold temperature (TL) set in advance. When the detected temperature (T) is equal to or greater than the threshold value (TL), control proceeds to step S41 in FIG. 5*b*. On the other hand, at the detected temperature (T) being lower than the threshold temperature (TL), control proceeds to step S5.

First, description is made of a control procedure following step S5. In step S5, the unified control unit 60 sets the previously set the lower voltage limit (VL) to a lower voltage limit (VL1) lower than the lower voltage limit (VL). Note that the lower voltage limit (VL) represents such a lower voltage limit value at which the battery 30 may be used safely in a normal temperature condition in which the temperature of the battery 30 is higher than the threshold temperature TL. In addition, the lower voltage limit (VL1) represents such a lower voltage limit value at which the battery 30 may be used safely at a low temperature condition in which a temperature of the battery 30 is lower than the lower limit temperature (TL).

In step S6, the voltage control unit 601 supplies the power to the battery 30 necessary for starting the engine 10, and the internal combustion engine starting unit 603 cranks the engine 10. At step S7, the unified control unit 60 determines, based on a signal transmitted from the engine control unit 70, whether or not a complete combustion flag indicating complete or self-sustained combustion is ON. The engine control unit 70 manages a state of the engine 10 based on rotation speed of the engine 10. When the rotation speed of the engine 10 is higher than a predetermined rotation speed at which a complete combustion is assumed, then the engine control unit 70 sets the complete combustion flag ON while at the rotation speed being lower than the threshold rotation speed at which complete combustion or explosion is established, the engine control unit 70 turns the complete combustion flag to OFF.

When the complete combustion flag in an OFF state, at step S71, the unified control unit 60 determines whether or not a predetermined time has elapsed after receipt of the starting signal. When the predetermined time has elapsed (time-out), control of present embodiment will end. Thus, when the engine may not be combusted completely and operated autonomously, then the discharge from the battery 30 will be inhibited. On the other hand, unless the predetermined time has elapsed, control proceeds to step S72. In step S72, the voltage control unit 601 compares detected voltage of the battery 30 with the lower voltage limit (VL1). When the detected voltage exceeds the lower voltage limit (VL1), the voltage control unit 601 continues to supply the current output power to the motor/generator 20 thereby cranking the engine 10, and control returns to step S6. On the other hand, when the detected voltage is lower than the lower voltage limit (VL1), or when the detected voltage lowers and reaches the lower voltage limit (VL1), then the voltage control unit 601 lowers power of battery 30 and controls battery 30 so as to raise the voltage of the battery 30 higher than the lower voltage limit (VL1), and control returns to step S7.

When the complete combustion flag is turned ON in step S7, the unified control unit 60 now controls power of the battery 30 by the power control unit 602. Thus, while driving the vehicle, control is made by the power control unit 602 to thereby stabilize the vehicle behavior. At step S9, the unified control unit 60 compares the detection voltage of the battery 30 with the lower voltage limit (VL). More specifically, a determination is made as to whether the detection voltage of the battery 30 exceeds higher that the lower voltage limit (VL) prior to being set to the lower voltage limit (VL1) in step S5. In step S91, when the detection voltage of the battery 30 is lower than the lower voltage limit (VL), the battery 30 is charged and control returns to step S8. When the battery 30 is used continuously for a long time at low voltage, deterioration is accelerated. Therefore, after engine has combusted fully or completely, the battery 30 will be charged by using power of the engine 10 to increase the voltage of the battery 30. Note that voltage of the battery 30 may be higher than the lower voltage limit (VL) due to release of discharge load imposed on the battery 30, the control process in step S91 is therefore not necessarily required, but such a control may be carried out so as not to impose a discharge load on the battery 30. When the detection voltage of the battery 30 is higher than lower voltage limit (VL), the unified control unit 60 returns the lower voltage limit (VL1) to the lower voltage limit (VL) (step S10), and control of present embodiment ends.

Then, in step S4, in a situation in which the detected temperature (T) is equal to or greater than a threshold temperature (TL), the control routine or procedure following step S41 is now described with reference to FIG. 5b. In step S41, the voltage control unit 601 compares the power necessary to start the engine 10 with the output power (instantaneous value) of the battery 30. When the output power (instantaneous value) of battery 30 exceeds the required output power, control proceeds to step S43. On the other hand, when output power (instantaneous value) is below the required power, then the rotation speed setting unit 604 lowers the rotation speed of the motor/generator 20 for starting engine 10 in step S42. Thus, the power required for starting the engine 10 will be lower. Note that the rotation speed setting unit 604 may lower the rotation speed stepwise, or alternatively, the rotation speed setting unit 604 may lower to the rotation speed at which the required power corresponds to the output power.

In step S43, voltage control unit 601 supplies power required to start engine 10 to battery 30, while the internal combustion starting unit 603 cranks the engine 10. In step S44, the unified control unit 60 determines whether or not the complete combustion flag is set ON. In the case of complete combustion flag being OFF, in step S441, the unified control unit 60 determines whether or not the timeout has been expired. At timeout being confirmed, the control of present embodiment terminates. Thus, when combustion of engine is not completed by output of the battery 30, discharge from the battery 30 is prohibited. Unless timeout has been expired, in step S442, the voltage control unit 601 compares detection voltage of the battery 30 with the lower voltage limit (VL). When the detection voltage is greater than the lower voltage limit (VL), the voltage control unit 601 continuously supplies the current output power to the motor/generator 20, and cranks the engine 10 further and control returns to step S44. On the other hand, when detection voltage is lower than the lower voltage limit (VL), or when the detection voltage lowers to reach the lower voltage limit (VL), then voltage control unit 601 lower the power of the battery 30 (step S443), controls the battery 30 so that the voltage across the battery 30 will be higher than lower voltage limit (VL), and control returns to step S44.

When the complete combustion flag is turned ON in step S44, in step S45, the unified controller 60 controls power of the battery 30 by the power control unit 602 and terminates the control of present embodiment.

As described above, in the present embodiment, the voltage control unit 601 controls output of the battery 30 in accordance with the comparison result between the detection voltage of the voltage sensor 31 and a limit voltage of the battery 30, and in accordance with the output of the battery 30 controlled by the voltage control unit 601, the inverter 35 is controlled to start the engine 10. Thus, the battery 30 may be controlled within a safety voltage range to thereby start engine, and the power may be efficiently output up to the limit value of voltage of battery the 30. As a result, the range of use of condition of battery may be broadened. In addition, by carrying on the voltage control while withholding the power control, the full energy of the battery 30 may be used for cranking operation and thus may expand the starting enabling conditions of the engine 10.

Moreover, in the present embodiment, when starting the engine 10, output of the battery 30 is controlled by the voltage control unit 601, and output control of battery 30 by the power control unit 602 is prohibited so that the power control unit 602 does not carries out power control. Therefore, when starting the engine 10, the rotation speed setting is possible by using the output power value (instantaneous value) available with the battery instantaneously or momentarily, which would lead to a higher probability of complete combustion of the engine 10. In addition, even with the prolonged time between cranking of the engine 10 and the complete combustion, the battery 30 may provide an actually available or outputtable power up until complete combustion on a continuous basis within the range of upper and lower limits.

Further in the present embodiment, when the detection voltage of the battery 30 is lower than the lower voltage limit (VL or VL1), the output of the battery 30 is restricted. Thus it may be prevented that the detection voltage further lowers to over-discharged state of battery.

In addition, when the power output from the battery 30 is lower than the power required for starting the engine 10, the rotation speed of motor/generator for starting the engine 10 is reduced. Thus, the power required for starting the engine 10 may be lowered and thus the engine 10 may be cranked.

Further, when the detection temperature of the battery 30 detected by the temperature sensor 32 is lower than the threshold value (TL), the voltage control unit 601 sets the lower voltage limit (VL) to a lower voltage limit (VL1). Thus, at the battery 30 being at lower temperature, by lowering the lower voltage limit (VL), output of the battery 30 may be raised. As a result, the range of use of condition of the battery 30 may be expanded.

Moreover, in the present embodiment, after lowering the lower voltage limit to the lower voltage limit (VL1), when the voltage of the battery 30 is higher than the lower voltage limit (VL), control returns the lower voltage limit (VL1) to the lower voltage limit (VL). Thus, within a range of low voltage, the battery 30 may be prevented from being used for a long time in the lower voltage region so that protection of the battery 30 may be achieved.

In addition, in the present embodiment, in response to receipt of starting signal to start the engine 10, the voltage control unit 601 controls the battery 30, and when receiving a signal indicative of complete combustion of the engine 10, the power control unit 602 controls the battery 30. Therefore, when starting the engine 10, the power may be derived up to the lower voltage limit of the battery 30 so that the range of use of the battery 30 may be expanded. Also, after complete combustion of the engine 10, the voltage of the battery 30 may be raised by power of the engine 10, so that, even under power control, voltage of the battery 30 may be maintained within a safety voltage range. Thus the battery 30 is protected while extending the battery life and stabilizing the vehicle operation.

In addition, in the present embodiment, when engine may not be combusted completely by output of the battery 30, discharge from the battery 30 will be prohibited. Thus, the battery 30 will be prevented from being over-discharged.

Note that, in the present embodiment, after the engine 10 has been completely combusted, the power control unit 602 may control the battery 30 accompanied by the control by the voltage control unit 601. In addition, in the present embodiment, in response to the driver's turning ignition switch ON and control receiving a starting signal to start the engine 10, the voltage control unit 601 control voltage takes place. However during vehicle drive, when starting engine during transition from EV drive mode to HEV drive mode, or, from EV drive mode to the drive mode of engine only, such a voltage control by the voltage control unit 601 may be performed. In addition, in the state in which the vehicle is stopped at traffic signal, etc., for example, when starting the engine 10, the voltage control unit 601 may perform a voltage control. In addition, only when the ignition switch is turned on by the driver and a starting signal to start the engine 10 is received, the voltage control by the voltage control unit 601 may be performed.

Further, in the present embodiment, before receiving a starting signal to start the engine 10, when the power control by the power control unit 602 has been carried out, upon receipt of the starting signal to start the engine 10, switch may be made from the power control to voltage control by the voltage control unit 601.

Further, with respect to voltage detection by the voltage sensor 32, when a plurality of unit cells are incorporated in the battery 30, the motor control unit 80 may monitor respective cell voltages and a total voltage of the battery pack containing the plurality of unit cells. In this instance, the limit voltage may be provided with respect to each cell voltage and the voltage of the overall pack, respectively. When managing the plurality of voltages of battery cells and that of overall battery pack, in step S4, the lower voltage limit of each cell may be lowered, or, such a lower voltage limit will be lowered with respect to the cell indicating a lower voltage.

With respect to control procedure in the control unit of this embodiment, strict compliance with those shown in FIG. 5 is not necessary, but each step may be replaced, or some of the steps may be omitted.

Note that, in step S71 and S441, when control is ended with a timeout, repetitive starting operations of the engine 10 may lead to over-discharge of the battery 30. Therefore, when, for example, attempting to start the engine 10 a predetermined number of times without success of engine start, such a control to withhold a restarting may be carried out. In addition, when the voltage of battery 30 is lower than a predetermined voltage, restarting operation may well be withheld. The predetermined voltage may be set at which load will be applied on the battery 30 by engine restart and the battery 30 would be over-discharged.

The above described engine 10 corresponds to the internal combustion engine according to the present invention, the motor/generator 20 corresponds to the motor according to the present invention, the first clutch CL1 corresponds to the clutch according to the present invention, the voltage sensor 31 corresponds to the voltage detection unit according to the present invention. The voltage control unit 601 corresponds to the voltage control unit, the power control unit 602 corresponds to power control unit, the internal combustion engine starting unit 603 corresponds to the internal combustion engine starting unit, the rotation speed setting unit 604 corresponds to the rotation speed setting unit, the temperature sensor 32 corresponds to temperature detection unit. The lower voltage limit (VL) corresponds to the first lower voltage limit according to the present invention while the lower voltage limit (VL1) corresponds to the second lower voltage limit according to the present invention.

The invention claimed is:

1. A hybrid vehicle control system of a hybrid vehicle including an internal combustion engine, an electric motor, an inverter for controlling the motor, a clutch for selectively connecting and disconnecting power transmission between the internal combustion engine and the electric motor, and a battery for supplying electric power to the motor, the hybrid vehicle control system comprising:
    a voltage detection unit that detects a voltage of the battery;
    a voltage control unit that controls the voltage of the battery within a range of previously set limit voltage and calculates a currently available first power value of the battery based on the voltage of battery detected by the voltage detection unit;
    a power control unit that calculates a second power value available stably from a current timing for a predetermined time based on battery conditions of the battery and, in accordance with calculation results, controls the output of the battery in accordance with the second power value;
    an internal combustion engine starting unit that engages the clutch and starts the internal combustion engine by controlling the inverter based on the voltage of the battery that is controlled by the voltage control unit; and
    a rotation speed setting unit that sets a rotation speed of the electric motor to start the internal combustion engine, and being configured, when starting the internal combustion engine, to lower the rotation speed when the first power value is lower than a power value necessary to start the internal combustion engine so that the first power value will be higher than the power value necessary to start the internal combustion engine, while the power control unit is prohibited from controlling the output of the battery in accordance with the second power value.

2. The hybrid vehicle control system as recited in claim 1, wherein
the voltage control unit poses a restriction on the output of the battery when the detection voltage is lower than a lower voltage limit of the battery.

3. The hybrid vehicle control system as recited in claim 1, wherein
the voltage control unit controls the battery when receiving a starting signal to start the internal combustion engine; and
the power control unit controls the battery when receiving a signal indicative of complete combustion of the internal combustion engine.

4. The hybrid vehicle control system as recited in claim 1, further comprising
a temperature detection unit that detects a battery temperature, wherein
the voltage control unit sets and shifts from a first lower voltage limit to a second lower voltage limit lower than the first voltage limit when the temperature detected by the temperature detection unit is lower than a predetermined temperature.

5. The hybrid vehicle control system as recited in claim 4, wherein
the voltage control unit shifts from the second lower voltage limit to the first lower voltage limit when the detection voltage of the voltage detection unit becomes higher than the first lower voltage limit after having set to the second lower voltage limit .

6. The hybrid vehicle control system as recited in claim 1, wherein
the voltage control unit inhibits discharge from the battery when complete combustion of the internal combustion engine is not possible.

7. The hybrid vehicle control system as recited in claim 2, wherein
the voltage control unit controls the battery when receiving a starting signal to start the internal combustion engine; and
the power control unit controls the battery when receiving a signal indicative of complete combustion of the internal combustion engine.

8. The hybrid vehicle control system as recited in claim 1, wherein
the voltage control unit poses a restriction on the output of the battery when the detection voltage of the voltage detection unit is lower than a lower voltage limit representative of a voltage limit.

9. The hybrid vehicle control system as recited in claim 2, further comprising;
a temperature detection unit that detects a battery temperature, wherein
the voltage control unit sets and shifts from a first lower voltage limit to a second lower voltage limit lower than the first voltage limit when the temperature detected by the temperature detection unit is lower than a predetermined temperature.

10. The hybrid vehicle control system as recited in claim 9, wherein
the voltage control unit shifts from the second lower voltage limit to the first lower voltage limit when the detection voltage of the voltage detection unit becomes higher than the first lower voltage limit after having set to the second lower voltage limit.

11. The hybrid vehicle control system as recited in claim 3, further comprising;
a temperature detection unit that detects a battery temperature, wherein
the voltage control unit sets and shifts from a first lower voltage limit to a second lower voltage limit lower than the first voltage limit when the temperature detected by the temperature detection unit is lower than a predetermined temperature.

12. The hybrid vehicle control system as recited in claim 11, wherein
the voltage control unit shifts from the second lower voltage limit to the first lower voltage limit when the detection voltage of the voltage detection unit becomes higher than the first lower voltage limit after having set to the second lower voltage limit.

13. The hybrid vehicle control system as recited in claim 2, wherein
the voltage control unit inhibits discharge from the battery when complete combustion of the internal combustion engine is not possible.

14. The hybrid vehicle control system as recited in claim 3, wherein
the voltage control unit inhibits discharge from the battery when complete combustion of the internal combustion engine is not possible.

15. The hybrid vehicle control system as recited in claim 4, wherein
the voltage control unit inhibits discharge from the battery when complete combustion of the internal combustion engine is not possible.

16. The hybrid vehicle control system as recited in claim 5, wherein
the voltage control unit inhibits discharge from the battery when complete combustion of the internal combustion engine is not possible.

* * * * *